Sept. 22, 1931. W. F. HENDRY 1,824,432
PACKING MACHINE
Filed June 8, 1928 3 Sheets-Sheet 2

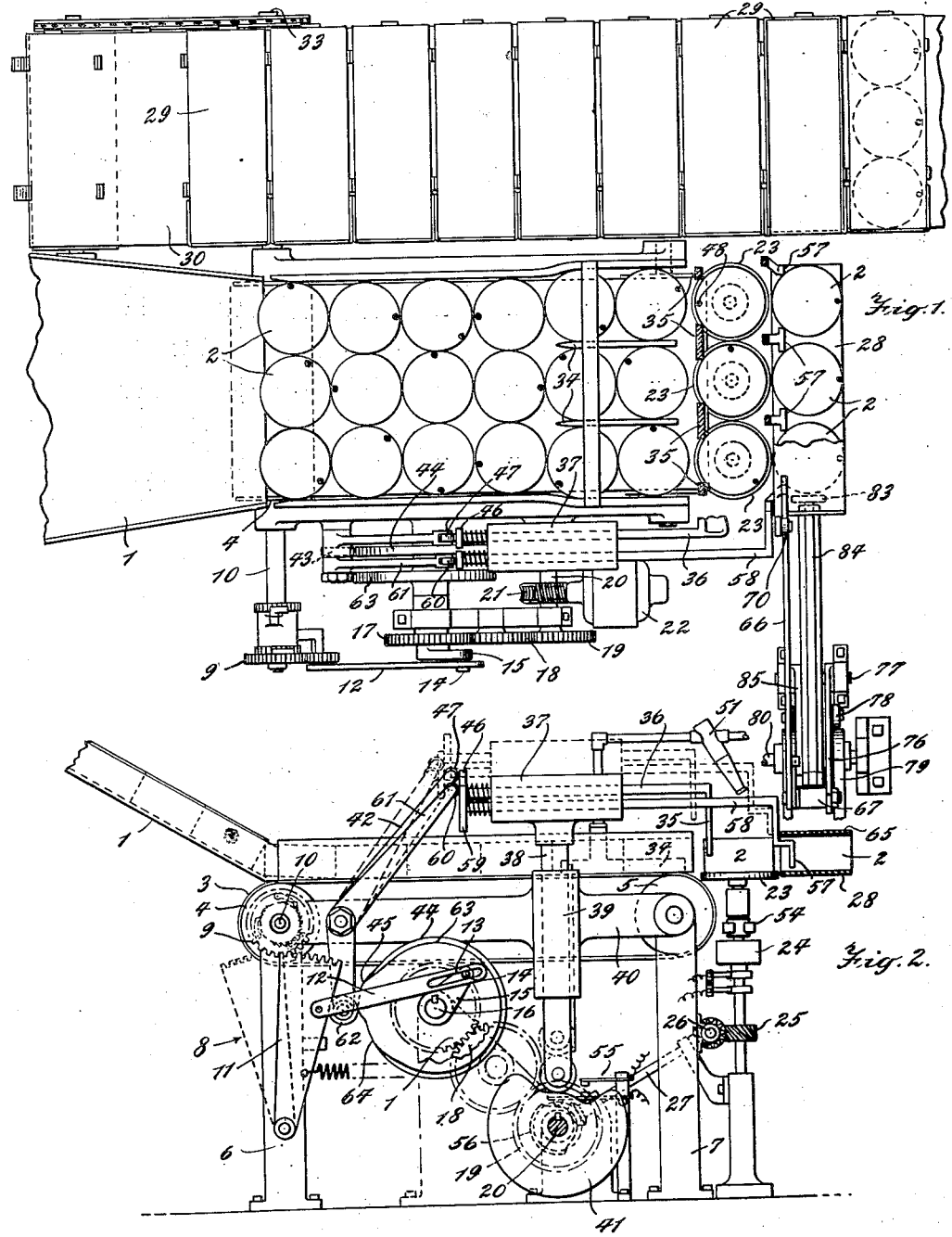

INVENTOR.
W. F. Hendry
BY
ATTORNEYS.

Sept. 22, 1931.   W. F. HENDRY   1,824,432
PACKING MACHINE
Filed June 8, 1928   3 Sheets-Sheet 3
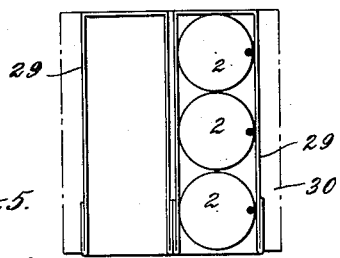
Fig. 5.
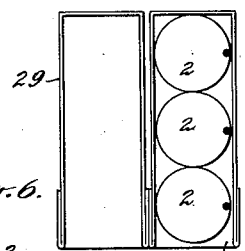
Fig. 6.
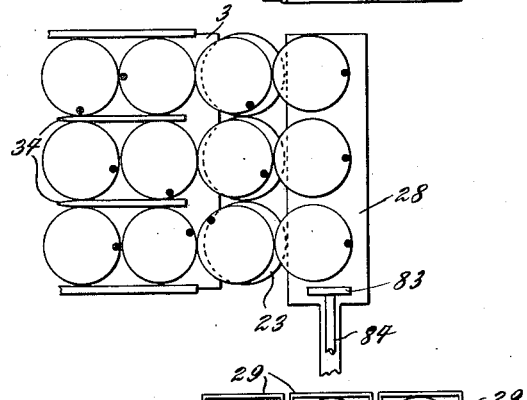
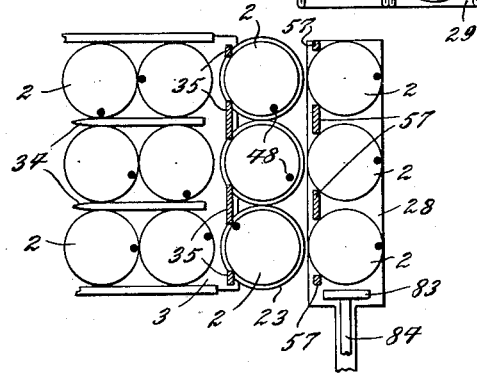
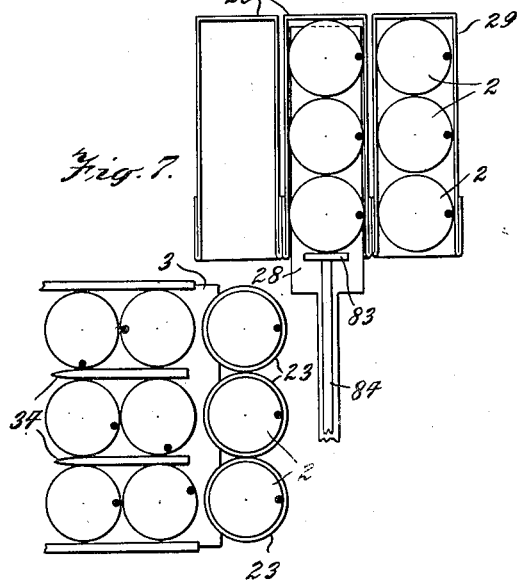
Fig. 7.
INVENTOR.
W. F. Hendry
BY
ATTORNEYS.

Patented Sept. 22, 1931

1,824,432

UNITED STATES PATENT OFFICE

WILLIAM F. HENDRY, OF OSSINING, NEW YORK, ASSIGNOR TO E. D. ANDERSON, INC., OF NEW YORK, N. Y., A CORPORATION OF DELAWARE

PACKING MACHINE

Application filed June 8, 1928. Serial No. 283,829.

This invention relates to packing machines, particularly to machines adapted for packing a plurality of boxes or similar articles into a carton.

It is an object of the invention to provide a machine for taking boxes or other articles in random fashion and adjusting the angular positions of the said boxes so that they all face the same way.

Another object is the provision of such a machine having means for grouping a series of articles in random angular positions, means for orienting the packages or adjusting their angular positions so that they all face the same way, and then thrusting the entire group of articles in a carton.

A further object of the invention is the provision of means for preventing the positioned articles from being turned while being thrust into a carton.

More specifically, it is an object of my invention to provide a machine having a conveyor for receiving articles in random positions and transporting said articles to turntables by means of which the angular positions of the articles are adjusted and means for placing the adjusted articles in a carton. This machine comprises a conveyor of any suitable kind, for example, a belt conveyor intermittently operable, or a conveyor comprising rails for guiding the articles, and pushing means for sliding the articles along the rails, and a turn table or series of turn tables driven by suitable power means. Connected between each of the turn tables and the power means is an automatically operable clutching means whereby the turn tables can be disengaged from the driving means when desirable. Associated with the turn tables, are means for centering the articles on the said turn tables, means for delivering the articles from the turn tables and suitable grouping means for holding the delivered articles and thrusting them into a carton, the said carton being positioned at the proper moment by any suitable means such as an intermittently movable pocket type conveyor. The turning of the articles to the proper position on the turn tables is accomplished by placing on each article an identifying spot or design and providing adjacent to each turn table a light source for focusing a beam of light on the article as it is rotated, the said beam striking the article in the path of rotation of the said identifying spot, and focusing on the point of contact of the light beam on the article a photo-electric cell or similar light responsive device. This light responsive device will be actuated by the reflected light rays from the package, the said photo-electric cell being connected through suitable amplifying and relaying means to the automatically operable clutch interposed between the turn table and the driving means thereof, so as to release the clutch in response to the attainment by the article of a predetermined angular position as evidenced by the action of the reflected light on the light responsive element. The automatic clutch may be electromechanically operated itself or may be any suitable type of mechanical clutch remotely controlled by electromagnetic or other suitable motor means. Instead of a clutch and common driving means, individual driving means, such as an electric motor, may be used for each turn table, the motor being started and stopped to accomplish turning of the article.

In accordance with my invention, the identifying spot on the package may be black so as to cause the current through the photo-electric cell to decrease upon the attainment by the article on the turn table of a predetermined angular position. The spot may be merely a round spot or may form a part of the printing or decoration that may be present on the article handled. For example, where a label is pasted on the article the identifying spot may be a portion of the printing matter on the label or may be a portion of a design, as a fleur-de-lis. However, the spot need not necessarily be black, it may be white, or lighter than the rest of the article so that the current through the photo-electric cell will be increased when the article has assumed the desired position. Likewise, if desirable colored spots may be used instead of either black or white spots, the prime requisite being that the light reflected from the identifying spot be of a different quantity or quality from that reflected by the rest of the article in the path of rotation viewed by the photo-electric cell or other light responsive means, so that the response of the said light responsive means will be different for the identifying spot than for the rest of the article.

From this it will be seen that if an entirely black article were being handled, a light colored spot should be used and if a white article were being handled a dark spot should be used. In some cases, it will be found that the artistic effect of the article would be blemished by the placing of a white or black spot of any ordinary geometrical form and in such case it would be preferable to make this spot of some contrasting color and of a configuration such as to blend in the design on the article.

With certain types of articles, the light responsive device may be dispensed with and identifying spots of tin foil or other conducting material placed on the articles to be handled, and in cooperative relation therewith may be provided suitable contacting means for closing an electric circuit in response to the attainment by the article of the desired position. In case the article being handled were entirely covered with tin foil the identifying spot could be insulated in a suitable manner, as by placing a piece of paper or other insulating material on the surface of the article, in which case an electric circuit would be broken in response to the attainment by the article of the desired position.

The above mentioned and other objects and advantages and the manner of attaining them will be made clear in the following detailed description taken in conjunction with the accompanying drawings.

In the drawings, Fig. 1 is a plan view of a packing machine constructed in accordance with my invention.

Fig. 2 is an elevation view, partly in section, of the machine shown in Fig. 1.

Fig. 5 shows the part of the conveyor mechanism associated with the turn tables, and packages positioned on the turn tables ready for centering.

Fig. 6 is a similar view of the packages centered on the turn tables.

Fig. 7 is a view similar to Figs. 5 and 6 except that it shows the packages on the turn tables oriented and a group of packages being positioned in a carton.

Figure 3:
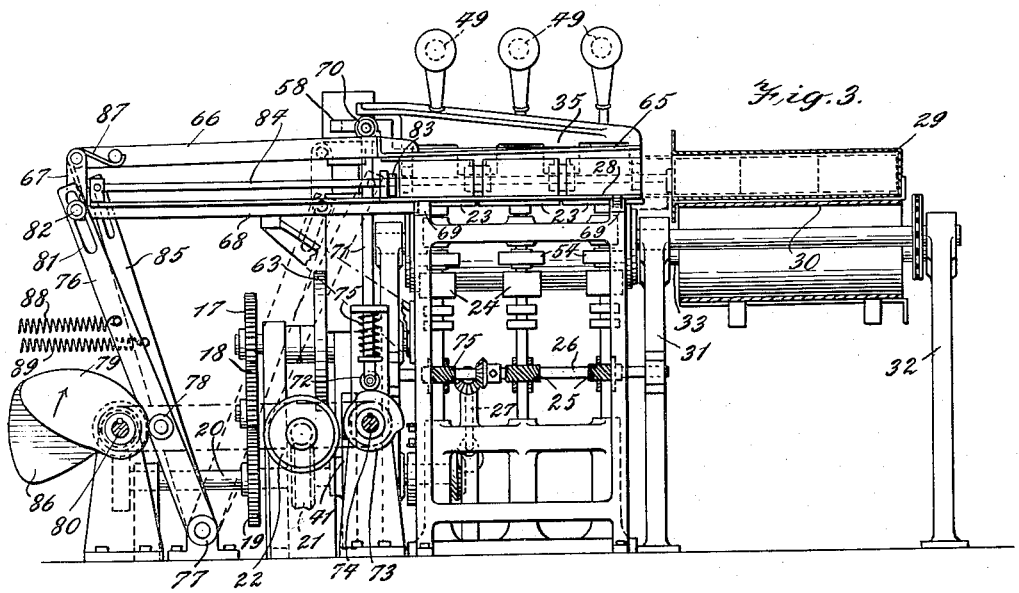
Fig. 3 is an end view partly in section of the machine shown in Fig. 1.
Figure 4:
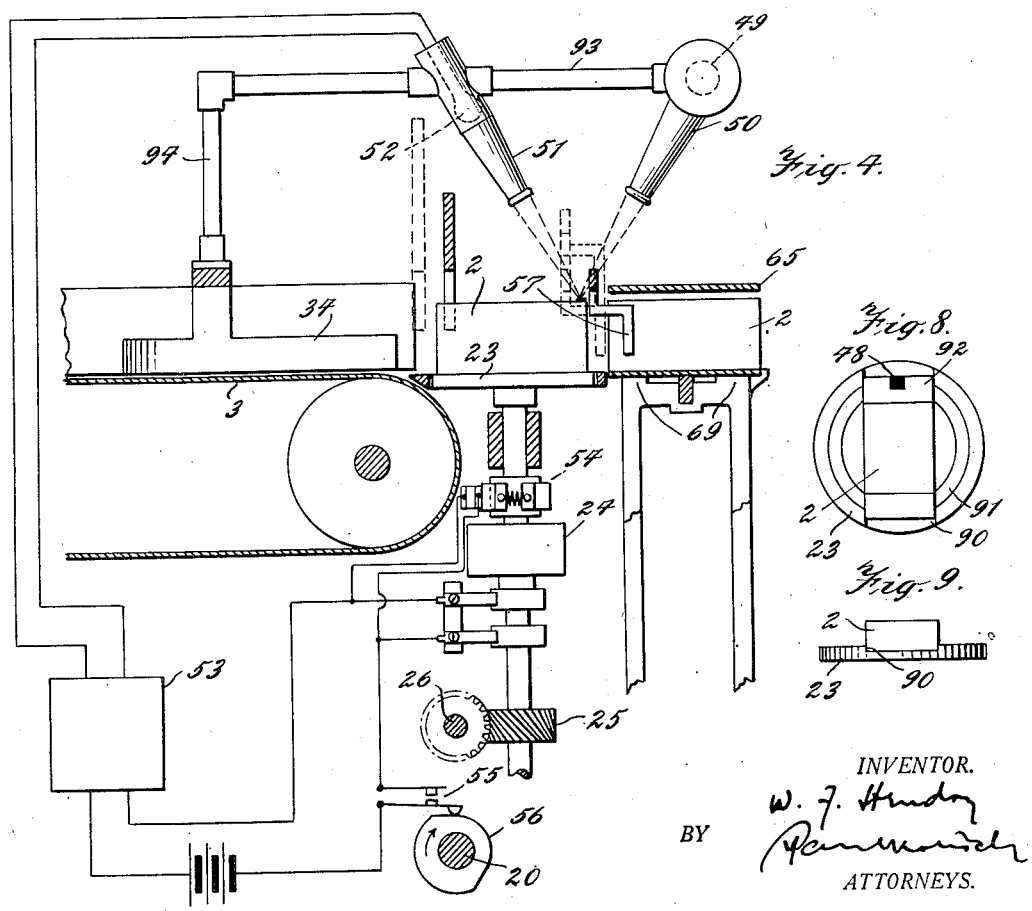
Fig. 4 is a detail view of the portion of the mechanism utilized in orienting packages.

Referring more particularly to the drawings, reference numeral 1 indicates a chute on which are deposited a plurality of packages 2, having random angular positions. These packages 2 slide from the chute on to a belt conveyor 3 carried on pulleys 4 and 5 supported by shafts journaled in the frame members 6 and 7 of the machine. The conveyor is driven in step by step motion a distance equal to the width of one package by a stepping mechanism 8 comprising a one way pawl clutch gear 9 cooperating with a shaft 10, a pulley 4 and a gear sector 11 pivotally mounted on the frame member 6. The gear sector 11 is rocked by means of a drag-link 12 having a lost motion slot 13 with which cooperates a crank pin 14 forming part of a crank arm 15 which is keyed to a shaft 16. The shaft 16 carries a gear 17 with which an idler gear 18, driven by a main drive gear 19, meshes. The main drive gear 19 is keyed to a shaft 20 which is driven through a worm gear mechanism 21 by a motor 22. Positioned adjacent the end of the conveyor 3 are a plurality of turn tables 23. Each turn table is interconnected through a magnetic clutch 24 and a spiral gear 25 with a jack shaft 26 driven through a bevel gear drive 27 by means of the power shaft 20. Beside the turn tables 23 is positioned a receiving plate 28 which is slidably mounted in a manner to be described more fully hereinafter, to thrust the packages placed thereon into one of a series of cartons 29 carried by a carton conveyor 30. This conveyor 30 is supported by frame members 31 and 32 and is driven by an extension 33 of the shaft 10. As the shaft 10 is rotated in step by step fashion by the stepping mechanism 8, the conveyor 30 will be moved in step by step fashion also, in synchronism with the movements of the conveyor 3 which is driven by shaft 10. For moving apart slightly, packages carried by the conveyor 3, separating fingers 34 are provided. As indicated in Fig. 5, the stepping motion of the conveyor is not sufficient fully to center the packages on the turn tables. In order to accomplish exact positioning of the packages, a centering member 35, carried by a rod 36 slidably mounted in a guide block 37, is brought into play. The guide block 37 is supported by a vertically reciprocable push rod 38 slidably mounted in a guide sleeve 39 supported by a portion 40 of the frame of the machine. The push rod 38 is reciprocated vertically at the proper moment by means of a cam 41 carried by the shaft 20. This cam drops the push rod 38 and guide block 37 for a short interval of time, during which the rod 36 is thrust in a right handed direction, as viewed in Fig. 1, by means of a bell crank 42 rockably supported on the frame portion 40 and having cooperating with one arm thereof, which carries a cam follower 43, a cam 44, which cam is keyed to the shaft 16. This cam is provided with a raised portion 45 which causes the bell crank to be rocked and the shaft 36 and centering member 35 to be moved in a right hand direction to center the packages on the turn tables. The end of the rod 36 which cooperates with the bell crank 42 has a vertical bearing plate 46 against which a roller 47 attached to the bell crank operates. Each package has a spot 48 thereon which is preferably white and upon each package, in the path of rotation in the spot, is focused a beam of light from a light source 49 enclosed in a hood 50. The hood 50, if desirable, may be provided with a suitable lens system for focusing the beam of light on the proper portion of the package. This beam of light is reflected from the surface of the package through a hood 51 into a photo electric cell 52, which is interconnected through a suitable amplifier and relay system 53 with the magnetic clutch 24. There is a light source and a photo cell for each turn table and the various light sources and photo cells are supported by a member 93 attached to a bracket 94 secured to the frame of the machine. The current through the photo cell varies in accordance with the light reflected from the package. When the white spot on the package comes to the focus of the photo cell the current thru the cell increases which, through the amplifier and relay system 53, causes the clutch 24 to be deenergized and released. Simultaneously, with this releasing of the clutch 24, an electric brake 54 serving to stop the rotation of the table 23 is deenergized. This brake is of the type wherein when the current is cut off, the brake is applied. Both the brake and clutch obviously might be made to work in the opposite manner; that is to say, the clutch might be made to be opened and the brake applied upon the application of current. However, for obvious reasons on the side of safety, it is best to have the brake and clutch work in the manner outlined above. In order to insure that each package shall be turned so that its spot will occupy the proper position even if the spot were, before the turn table was rotated, positioned but slightly away from its correct position, so that it would have to be turned substantially a full revolution in order to bring it back to its correct position, the turn tables are made to be rotated a maximum of one revolution. After making one revolution they are all disconnected from the driving source so that when the packages move in such a manner that the white spot is no longer at the focal point of the light source 49, the turn tables will not be started revolving again. The means for accomplishing this result comprises a pair of contacts 55 interconnected in the electric circuits supplying the clutch and brake, and a cam 56 keyed to the shaft 20. The shape of the cam 56 is made such that the power circuit of the clutch and brake is broken after a period of time corresponding to one uninterrupted revolution of the turn tables. The centered packages are moved onto the receiving plate 28 by a forward movement of the conveyor 3, but are not fully centered on the plate, as shown in Fig. 5. These packages are accurately positioned on the receiving plate 28 by means of a centering member 57 attached to a rod 58 slidably supported in the guide block 37, and having at its left hand end a vertical plate 59 with which cooperates a roller 60 attached to one end of a bell crank 61 pivotally supported on the frame portion 40 and having at its other end a cam roller 62 cooperating with a cam 63 keyed to the shaft 16. The centering member 57 is thrust forward through the action of the cam and the bell crank thereby pushing the packages 2 fully onto the receiving plate 28 and centering them as illustrated in Fig. 6. In order to hold the packages on the plate 28 while they are being thrust into one of the cartons 29 and to prevent them from turning out of their proper position due to rubbing on the walls of the carton, a holding plate 65 is provided. This holding plate is joined to a rod 66 pivotally connected to a link 67 fastened to a rod 68 secured to the plate 28, the plate 28 being slidably supported on guides 69. When the packages are ready to be thrust into the carton 29, a roller 70 attached to a push rod 71 carrying at its lower end a cam follower 72 resting on a cam 73 keyed to a shaft 74 driven by the shaft 20, is pressed by spring 75 into engagement with the top side of rod 66, causing the plate 65 to be pressed down on top of the packages 2 to hold them in position. For thrusting the packages, held between the plates 28 and 65 into the carton, a lever arm 76 is provided. This lever arm is pivoted to the frame of the machine at 77 and is provided with a cam follower 78 with which cooperates a cam 79 keyed to a shaft 80 driven from the shaft 20. The upper end of the lever arm 76 has a slot 81 in which rides a pin 82 secured to the rod 68 of the plate 28. At the proper instant this cam 79 rotates the lever arm 73 in a clockwise direction as shown in Fig. 3 thrusting the packages 2 held between the plates 28 and 65 into the carton 29. At this same instant, a pusher 83 secured to a push rod 84 actuated by a lever arm 85 pivoted to the frame of the machine at 77 is thrust forward. This pusher is moved, through the agency of a cam 86, at the same speed as the packages and when the packages are fully seated in the box as indicated in Fig. 7, the pusher 83 holds them while the receiving plates 28 and the holding plates 65 are withdrawn from the carton. Prior to the withdrawal of the plates 28 and 65, the cam 73 turns sufficiently to thrust the rod 71 in an upward direction against the compression of the spring 75, thus relieving the pressure of the receiving plate 65 on top of the packages 2 and permitting the receiver plates to be withdrawn from the carton without disturbing the angular position of the packages. The plates 65 are urged away from a closed position by a spring 87. As soon as the plates 28 and 65 have been fully withdrawn from the carton 29, the cam 86 rotates to such a position that the push rod 84 is moved in a left handed direction pulling the pusher 83 away from the carton leaving the packages in place. In order to turn the lever arms 76 and 85 to their normal positions, springs 88 and 89 are provided.

The operation of the machine is as follows: Packages or boxes 2 are placed on the chute 1 in any suitable manner, for example, they may be fed thereon from a machine which packages material, or places a label on top of a package. These packages slide by gravity onto the belt conveyor 3 and are carried along by the conveyor, which moves in spaced steps, the steps being equal to the width of one package. As soon as the group of packages reaches the end of the conveyor, the next step of the conveyor thrusts them onto the turn tables 23, to a position almost but not quite at the center thereof. At this instant the cam 41 is turned to such a position that the guide block 37 drops downwardly as shown in Fig. 2, placing the centering member 35 adjacent the packages 2, as indicated in Fig. 1. The cam 44 through the agency of the bell crank 42 moves the centering element 35 in a right hand direction, as viewed in Figs. 1 and 2, a slight distance thereby centering the packages 2 fully on the turn tables 23. The centering member now recedes and the guide block 37 rises carrying the centering member out of contact with the packages. By this time, the cam 56 has rotated so that it closes the contact 55 energizing the magnetic clutch 24 and releasing the brake 54. The energization of the clutch 54 connects the turn table 23 with the jack shaft 26 which is rotating continuously. The turn table being connected with the jack shaft 26 rotates carrying with it the package positioned thereon. Each package revolves until the white spot 48 thereon comes to the focal point of the light emitting element 49 and photo cell 52. At this instant, a large amount of light is reflected into the photo cell 56, which through the amplifier and relay arrangement 53, causes the clutch 24 and brake 54 to be deenergized thereby disconnecting the turn table 23 from the jack shaft 26 and applying the brake, stopping the turn table almost instantly. Each of the packages 2 stop with the spot in its proper positions, some after having rotated but a small portion of a revolution and others after having rotated a large portion of the revolution, depending upon their particular angular positions when placed upon the turn tables. All packages having now been oriented so that their spots face the same way, the cam 56 opens the contact 55 insuring that the clutch and brake shall remain deenergized through the next few operations of the machine. At this time, the conveyor 3 makes another step pushing more packages 2 onto the turn tables 23 and pushing the packages already thereon off the turn tables 23 on to the receiving plate 28. Just as with the turn tables, the packages are not pushed fully upon the receiving plate, and in order to center them the guide block 37 again drops under the action of the cam 41, which it will be seen rotates in step with the conveyor 3, thereby bringing the centering element 57 adjacent the packages 2. At this time, the cam 63 rotates sufficiently to rock the bell crank and thrust the centering element 57 ahead, centering the packages accurately on the receiving plate 28. After the packages have been centered, the element 57 recedes from between the receiving plate 28 and the holding plate 65 whereupon the guide block 37 rises, carrying the centering element out of line with the packages on the turn tables. Having been lifted clear of the packages, the centering element, through the action of the cam 53 again recedes slightly to its initial position. After this action has taken place, the holding plate 65 is spring pressed on to the top of the packages 2 through the action of the cam 73, spring 75, push rod 71 and roller 70. The wrapped packages now are thrust into a carton 29 carried by the conveyor 30, through the action of the cams 79 and 86. As soon as the packages are positioned in the cartons, the plates 28 and 65 recede while the packages are pushed together slightly and held in the carton by the pusher 83. As soon as the plates have been fully withdrawn from the carton, the pusher, under the action of its cam and returning spring, recedes to its normal position and the machine is ready for another cycle of operation. It will be noted that the conveyor 30 moves in step with the conveyor 3 so that a fresh carton is positioned as a new group of oriented packages is moved onto the receiving plate 28.

While I have illustrated a machine for operating on a single row of three packages, it will be understood that more than three packages might be dealt with and likewise that two or more rows of packages might be handled at the same time. To do this, it would be necessary merely to have two or more rows of turn tables with their cooperating elements and photo cells.

Instead of having a continuously rotated jack shaft 26 and a clutch between the jack shaft and the turn table, each turn table might be driven by a separate motor means and the photo cell made to start and stop the motor means directly at the proper instant.

Figure 8:
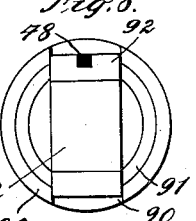
Figs. 8 and 9 are respectively plan and elevation views of a turntable used for rectangular or square packages.
Figure 9:
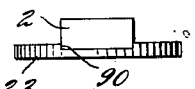

While I have mentioned that a photo electric cell is used, any other light sensitive means such as a selenium cell or the like, might be used as well.

Where it is desired to operate on square packages or rectangular packages, the turn table might be arranged as shown in Figs. 8 and 9. The turn table 23, as shown in Fig. 8, may have a groove 90 for receiving the package and be provided with a band of paint or the like 91. The package 2 will be provided with a spot 48, and an end portion 92 of the same color as the band 91. The end portion 92 and the band 91 might both be black and the spot 48 white or vice versa. If a machine were to operate in the same manner as disclosed in the operation of a round package, the band 91 and the end portion 92 might be black, or a dark color, and the spot 48 white. In operating on a rectangular package, it will be obvious that the package will either be in its correct position or 180° out of position. In either case, the turn table would stop in such position that the groove 90 would be in line to receive the next package.

While I have disclosed a particular embodiment of my invention for the purpose of illustration, it will be understood that such various modifications and adaptations as would occur to one skilled in the art may be made without a departure from the spirit of the invention as set forth in the following claims.

What I claim is:

1. In a packing machine, means for causing an article to assume a series of different positions and light responsive means for detecting one of said positions and rendering inactive said means first mentioned.

2. In a packing machine, a turn table, means for centering an article in a random angular position on said turn table, means for rotating said turn table through an angle sufficient to cause said article to assume a certain predetermined position with respect to a fixed point and means responsive to the attainment by said article of said position for rendering inoperative said means second mentioned.

3. In a packing machine, a turn table, a drive shaft for said table, a clutch between said shaft and said table and means operable in response to the attainment by an object on said table of a predetermined angular position, for causing said clutch to open.

4. In a packing machine, a turn table, means for rotating said turn table, means for coupling said turn table to said means first mentioned and light responsive means operable in response to the attainment by an object on said table, of a predetermined angular position for rendering inoperative said means second mentioned.

5. A packing machine according to claim 4 wherein the means for coupling the turn table to the means for rotating it comprises an electro-magnetic clutch.

6. In a packing machine, means for moving articles intermittently onto a turn table, light responsive means for controlling the operation of the turn table to turn said articles to a certain predetermined position and means for gripping said articles and thrusting them into a carton.

7. In a packing machine, means for turning a series of articles to a certain predetermined position, means for thrusting said articles into a carton and means for preventing said articles from turning from said position while being thrust into said carton.

8. In a packing machine, means for moving a plurality of parallel groups of articles as a unit, a group of turn tables for receiving said articles, means for centering said articles on said turn tables, driving means for rotating said turn tables, light responsive means for stopping said turn tables so that said articles all face the same way, means for moving said articles off said turn tables, and means for thrusting said group of articles into a carton.

9. In a packing machine, means for receiving packages in random angular positions, photo-electric means for identifying packages of like angular position and means for separating said packages into groups.

10. In a packing machine, means for assembling in the same plane a group of un-oriented articles, means for orienting said articles in said plane, and means for maintaining said articles in their oriented position and placing them in a carton.

11. In a packing machine, means for positioning an article, means comprising a light-responsive device for rotating said article to a certain predetermined position, and means for gripping said article and delivering it in said predetermined position.

In testimony whereof, I have signed my name to this specification this 6th day of June, 1928.

WILLIAM F. HENDRY.